(No Model.)
J. ANDERSON.
GATE.
No. 556,171. Patented Mar. 10, 1896.
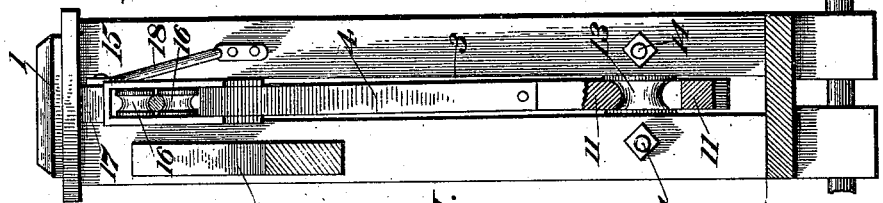
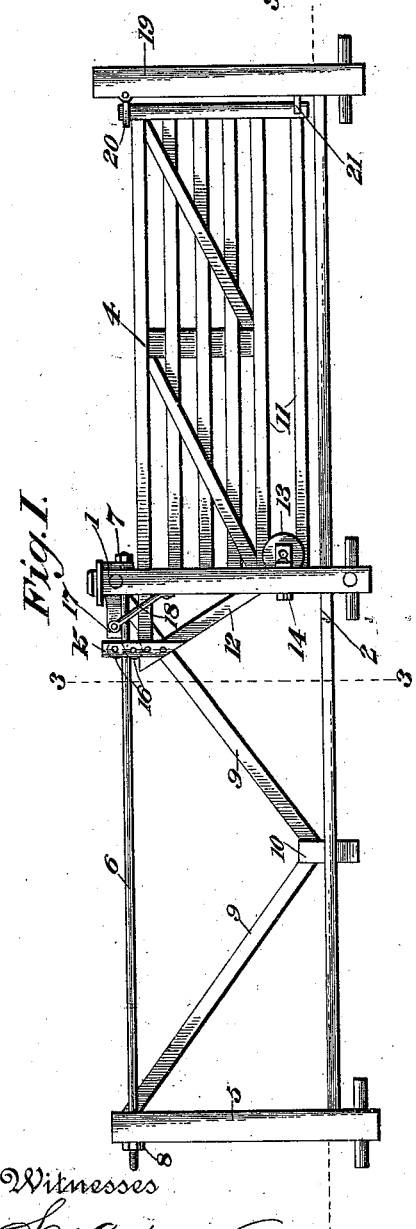
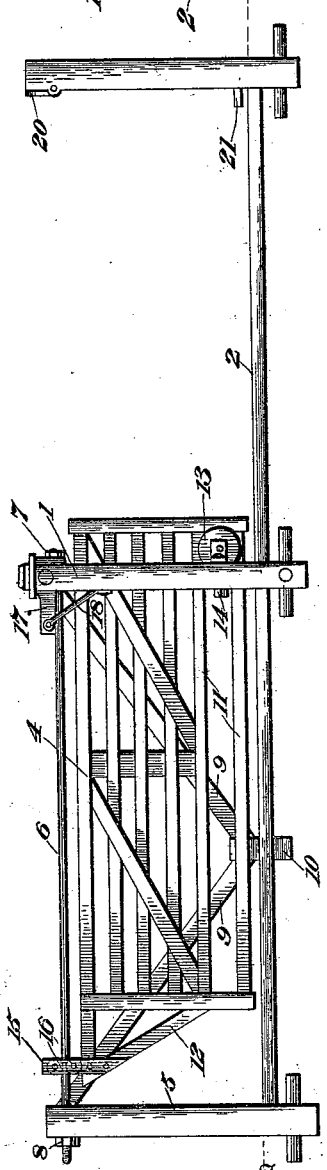
Witnesses
Inventor
John Anderson,
By Joseph T. Atkins
Attorney

UNITED STATES PATENT OFFICE.

JOHN ANDERSON, OF WOODSTOCK, CANADA.

GATE.

SPECIFICATION forming part of Letters Patent No. 556,171, dated March 10, 1896.

Application filed March 14, 1895. Serial No. 541,801. (No model.)

*To all whom it may concern:*

Be it known that I, JOHN ANDERSON, of Woodstock, in the Province of Ontario, Dominion of Canada, have invented certain new and useful Improvements in Gates, of which the following is a specification, reference being had to the accompanying drawings.

The object of my invention is to produce an improved sliding gate that is easily operated, economical in construction, and that is compact and simple in the arrangement of its parts.

In the accompanying drawings, Figure I is a side elevation of my gate closed. Fig. II is a similar view showing the same open. Fig. III is a vertical section on the line 3 3 of Fig. I, looking toward the supporting-post and with a portion of the upper part of the supporting-post removed.

Referring to the figures on the drawings, 1 indicates a supporting-post that is firmly driven in the ground, the line of which is indicated at 2. The supporting-post is either double or is provided with a vertical slit 3 within which a gate 4 slides.

5 indicates a brace-post firmly secured in the ground and united to the supporting-post, as by a guide-rod 6, secured as at one end by a head 7 and at the other end by a nut 8. Braces 9, secured to a foot-piece 10 at their lower ends and to the brace-post and supporting-post, respectively, may serve to keep the posts in the vertical position and to resist the strain of the guide-rod under the force of the nut.

The gate may be made of wood, of any suitable construction, the essential features being parallel tracks 11 consisting of two adjacent lower rails and a tailpiece 12, which is preferably triangular in outline, as illustrated. The tracks 11 serve partially to support the gate and to guide it in its shifting movement through the vertical slit 3, and upon a grooved roller 13 carried partially within the slit, as by eyebolts 14. The tailpiece carries a roller-frame 15, within which are pivotally supported opposite grooved rollers 16, that work upon the guide-rod 6.

When the gate is in the forward or closed position, the lower roller supports its weight, and when it is in the open position the upper roller supports it.

The object of employing in connection with the tailpiece the roller-frame 15 is to keep the frame 15 and the roller 13 as nearly as possible in the same vertical line, sufficient distance being allowed for the support of the gate when it is closed. Without this the operation of the gate requires too much space and renders it inconvenient for general purposes. The guide-rod performs an important function as sustaining the weight of the gate in both positions. If, however, it should sag or spring too much it will interfere with the proper movement of the gate. This may be practically prevented by the tension of the rod resisted by the braces 9. In order, however, that the gate may be maintained in the horizontal position when closed, it is necessary to provide special means for rendering the rod absolutely rigid and inflexible at that part which sustains the rollers 16 when the gate is closed. For that purpose I employ an overhanging brace-piece 17 projecting toward the brace-post above the guide-rod, and held rigidly in the horizontal position, as by a brace-rod 18 secured to the outer end of the brace-piece 17 at one end thereof, and secured at the other end to the supporting-post 1.

By the employment of the overhanging brace-piece described, upward yielding of the guide-rod is prevented when the gate is in the closed position, in which position the entire weight of the gate is exerted upwardly upon the guide-rod by the tailpiece, the supporting-roller acting as a fulcrum. The sagging of the front end of the gate incident to a slight yielding of the guide-rod is thus prevented, and the overhanging brace-piece at the same time constituting a stop for the tailpiece.

The gate closes against a stop-post 19, which may be provided with a swinging or other suitable catch 20 at its upper end and lateral stop-pieces 21 at its lower end.

What I claim is—

The combination with a supporting-base, brace-post and intermediate braces; of a metallic guide-rod; a gate provided with a tailpiece upon its rear extremity, and with rollers above and below the guide-track; a supporting-roller upon one side of the supporting-post; an overhanging piece projecting from the opposite side of the post immediately above the guide-rod constituting a stop for the tailpiece, and means for regulating the resistance of the guide-rod, substantially as specified.

In testimony of all which I have hereunto subscribed my name.

JOHN ANDERSON.

Witnesses:
DANIEL PEACOCK,
G. F. SNELGROVE.